US011896004B2

(12) United States Patent
Luck et al.

(10) Patent No.: US 11,896,004 B2
(45) Date of Patent: Feb. 13, 2024

(54) SENSING SYSTEM AND METHOD FOR DIRECT INJECTION SYSTEMS ON AGRICULTURAL SPRAYERS

(71) Applicant: NUTECH VENTURES, INC., Lincoln, NE (US)

(72) Inventors: Joe Luck, Lincoln, NE (US); Chandler Folkerts, Lincoln, NE (US)

(73) Assignee: NUTECH VENTURES, INC., Lincoln, NE (US)

( * ) Notice: Subject to any disclaimer, the term of this patent is extended or adjusted under 35 U.S.C. 154(b) by 474 days.

(21) Appl. No.: 17/283,719

(22) PCT Filed: Oct. 11, 2019

(86) PCT No.: PCT/US2019/055813
§ 371 (c)(1),
(2) Date: Apr. 8, 2021

(87) PCT Pub. No.: WO2020/077193
PCT Pub. Date: Apr. 16, 2020

(65) Prior Publication Data
US 2021/0321603 A1    Oct. 21, 2021

Related U.S. Application Data

(60) Provisional application No. 62/744,446, filed on Oct. 11, 2018.

(51) Int. Cl.
*A01M 7/00* (2006.01)
*A01C 23/00* (2006.01)
(Continued)

(52) U.S. Cl.
CPC ......... *A01M 7/0092* (2013.01); *A01C 23/007* (2013.01); *A01C 23/042* (2013.01);
(Continued)

(58) Field of Classification Search
CPC . A01M 7/0092; A01M 7/0089; A01C 23/007; A01C 23/042; B05B 7/26; B05B 12/1418; G05D 11/139
See application file for complete search history.

(56) References Cited

U.S. PATENT DOCUMENTS 4,530,463 A * 7/1985 Hiniker ............... A01M 7/0089
239/71
5,260,875 A * 11/1993 Tofte ..................... A01B 79/005
700/282
(Continued)

FOREIGN PATENT DOCUMENTS

CA          2644080 C  *  1/2013   ........... A01M 7/006
DE     102016119688 A1 *  4/2018
(Continued)

OTHER PUBLICATIONS

International Search Report and Written Opinion from the corresponding International Patent Application No. PCT/US2019/055813, dated Dec. 2, 2019.
Cai et al., "Closed-Loop Control of Chemical Injection Rate for a Direct Nozzle Injection System", Sensors, 2016, pp. 1-11, vol. 16, No. 1, MDPI.
Gil et al., "Use of a Terrestrial LIDAR Sensor for Drift Detection in Vineyard Spraying", Sensors, 2013, pp. 516-534, vol. 13, No. 1, MDPI.
(Continued)

*Primary Examiner* — Bob Zadeh
(74) *Attorney, Agent, or Firm* — Greer, Burns & Crain, Ltd.; Steven P. Fallon

(57) ABSTRACT

A method for monitoring and controlling chemical concentration in a direct injection agricultural sprayer system monitors initial chemical concentration output from a chemical tank, carrier flow from a carrier tank, and mixed chemical concentration at nozzles of the spray system downstream of individual mixing points of the nozzles. Flow from the carrier tank and/or the chemical tank are controlled to target a set concentration at each of the nozzles. The initial chemical concentration establishes maximum concentration and a calibration curve for a chemical being applied and the
(Continued)

mixed chemical concentration establishes an applied concentration in view of the calibration curve. A system is provided for the method.

16 Claims, 6 Drawing Sheets

(51) Int. Cl.
   *A01C 23/04* (2006.01)
   *B05B 7/26* (2006.01)
   *B05B 12/14* (2006.01)
   *G05D 11/13* (2006.01)
(52) U.S. Cl.
   CPC ............ *B05B 7/26* (2013.01); *B05B 12/1418* (2013.01); *G05D 11/139* (2013.01)

(56) References Cited

U.S. PATENT DOCUMENTS

| | | | | |
|---|---|---|---|---|
| 5,310,113 | A * | 5/1994 | Cowgur | B05B 12/1418 239/69 |
| 9,316,216 | B1 * | 4/2016 | Cook | F04B 13/02 |
| 2013/0140376 | A1 * | 6/2013 | Ballu | A01M 7/0092 239/147 |
| 2017/0082541 | A1 | 3/2017 | Posselius et al. | |
| 2021/0321603 | A1 * | 10/2021 | Luck | B05B 7/26 |

FOREIGN PATENT DOCUMENTS

| | | | | |
|---|---|---|---|---|
| EP | 3348142 | A1 | 7/2018 | |
| WO | WO-9943606 | A1 * | 9/1999 | ......... B05B 12/1418 |
| WO | WO-0195714 | A1 * | 12/2001 | .......... A01M 7/0089 |
| WO | WO-02076625 | A1 * | 10/2002 | .......... A01M 7/0085 |

OTHER PUBLICATIONS

Bigham, "Calibration and Testing of a Wireless Suspended Sediment Sensor", Master of Science Degree Thesis, 2012, Manhattan, KS: Kansas State University.
Hiloben, "Study on the Response Time of Direct Injection Systems for Variable Rate Application of Herbicides", PhD. Dissertation, 2007, Bonn, Germany: Rheinischen-Friedrich-Wilhelms University, Institute of Agricultural Engineering.
Dvorak et al., "Nozzle Sensor for In-System Chemical Concentration Monitoring", Transactions of the ASABE, 2016, pp. 1089-1099, vol. 59, No. 5, American Society of Agricultural and Biological Engineers.
Rockwell et al., "A Variable Rate, Direct Nozzle Injection Field Sprayer", Applied Engineering in Agriculture, 1996, pp. 531-538, vol. 12, No. 5, American Society of Agricultural Engineers.
Luck et al., "Evaluation of a Rhodamine-WT Dye/Glycerin Mixture as a Tracer for Testing Direct Injection Systems for Agricultural Sprayers", Applied Engineering in Agriculture, 2012, pp. 643-646, vol. 28, No. 5, American Society of Agricultural and Biological Engineers.
Crowe et al., "An Electronic Sensor to Characterize Transient Response of Nozzle Injection for Pesticide Spraying", Transactions of the ASAE, 2005, pp. 73-82, vol. 48, No. 1, American Society of Agricultural Engineers.
Mercaldi et al., "Smart and Customized Electrical Conductivity Sensor for Measurements of the Response Time from Sprayers Based on Direct Injection", Sensors & Transducers, 2015, pp. 1-10, vol. 193, No. 10, IFSA Publishing, S.L.
Sudduth et al., "Performance of a Chemical Injection Sprayer System", Applied Engineering in Agriculture, 1995, pp. 343-348, vol. 11, No. 3, American Society of Agricultural Engineers.
Dvorak et al., "An Optical Sprayer Nozzle Flow Rate Sensor", Transactions of the ASABE, 2015, pp. 251-259, vol. 68, No. 2, American Society of Agricultural and Biological Engineers.

* cited by examiner

SENSING SYSTEM AND METHOD FOR DIRECT INJECTION SYSTEMS ON AGRICULTURAL SPRAYERS

PRIORITY CLAIM AND REFERENCE TO RELATED APPLICATION

The application claims priority under 35 U.S.C. § 119 and all applicable statutes and treaties from prior U.S. provisional application Ser. No. 62/744,446 which was filed Oct. 11, 2018.

FIELD

The invention concerns direct injection systems on agricultural sprayers. The invention provides a sensing system for sensing and measuring a chemical being applied, e.g., pesticide, herbicide, or fertilizer, and for controlling the accuracy of the application of the chemical.

BACKGROUND

Chemical application systems for agricultural sprayers generally rely on mixing of a chemical with water in a tank, then spraying that mixture on the targeted field or crop. A different type of system is a direct injection (DI) system, which stores the chemical and water in separate tanks and mix the two in-line, prior to leaving the spray nozzles. DI systems have suffered low adoption rates (due to issues including lag-time, injection rate accuracy, etc.) but have seen renewed interest in recent years due to new chemical formulations.

Researchers have developed several ways that seek to achieve accurate measurements in direct injection systems. Rockwell and Ayers (1996) used a fluorescent dye mixed into the chemical that was sprayed onto a collection device and then measured with a fluorimeter. Other studies have used a conductive solution mixed into water combined with an electrical conductivity sensor in order to measure the concentration of the conductive solution (Crowe et al., 2005; Mercaldi et al., 2015). Although these are effective for some chemicals, not all chemicals used in agricultural applications are conductive.

Vondricka and Lammers (2009) used a photoelectric sensor to measure mixture homogeneity in direct injection systems. Bingham (2012) used this type of sensor to measure turbidity in various streams. Dvorak and Bryant (2015) used two photodiode led pairs and a dye to measure flow rate. Sudduth et al. (1995), Hloberi (2007), and Dvorak et al. (2016) all used photoelectric sensors in combination with a dye in order to measure chemical concentration. They showed that a dye combined with the chemical in use could be accurately measured, so long as the calibration of the sensor was established. This means that the dye concentration must remain constant for the sensors calibrated for the systems to function with high sensitivity and accuracy. Advantageously, preferred systems eliminate the dependence upon an initial accurate sensor calibration and a constant dye concentration. The prior techniques rely on the ratio of full concentration to diluted concentration (including an inline carrier flow meter) to estimate chemical application rate based on the full concentration. If the initial calibration is not accurate or if dyes weren't consistently added during operation, sensor errors can introduce intolerable inaccuracies.

Posselius et al U.S. Published Application US20170082541 discloses a system that measure chemical concentrations of crop protection fluid based upon light transmission. A primary fluid tank provides carrier fluid to nozzle mixing chambers via a main distribution line. Secondary fluid tanks provide chemical fluid to the nozzle mixing chambers. The carrier and chemical are mixed in the nozzle mixing chamber. Light is transmitted through the mixing chamber of a nozzle and a sensor senses the light transmitted to an opposite side. Concentration in the mixing chamber is determined. Like the prior art in the previous paragraph, the full chemical concentration and dye must be maintained to be constant. If the dye dilution is off slightly or the chemical concentration varies initially, large errors in measurement can occur. This application also discusses measuring concentration in a mixing chamber. The mixing chamber provides a varying concentration that is highly dependent upon timing of when the measurement is taken, which may not be relatable to the actual concentration expelled by the nozzle. The control system is described as providing an iterative adjustment to achieve a target concentration but there is no discussion of how the nozzle concentration can be accurately related to the mixing chamber and there is no discussion of any technique to account for variation in the chemical concentration feed or a dye concentration of the chemical feed.

REFERENCES

Bigham, D. (2012). Calibration and testing of a wireless suspended sediment sensor. PhD diss. Manhatten, KS: Kansas State University.

Crowe, T. G., Downey, D., Giles, D. K., Slaughter, D. C. (2005). An electronic sensor to characterize transient response of nozzle injection for pesticide spraying. Transactions of the ASAE, 48(1), 73-82. https://doi.org/10.13031/2013.17942

Dvorak, J. S, Bryant, L. E. (2015). An Optical Sprayer Nozzle Flow Rate Sensor. Transactions of the ASABE, 251-259. https://doi.org/10.13031/trans.58.10765.

Dvorak, J. S, Stombaugh, T. S., Wan, Y. S. (2016). Nozzle Sensor for In-System Chemical Concentration Monitoring. Transactions of the ASABE, 59(5), 1089-1099. https://doi.org/10.13031/trans.59.11473

Hloběn, P. (2007). Study on the Response Time of Direct Injection Systems for Variable Rate Application of Herbicides. PhD diss. Bonn, Germany.: Rheinishe Friedrich-Wilhelms University, Institute of Agricultural Engineering.

Luck, J. D., Shearer, S. A., Luck, B. D., Payne, F. A. (2012). Evaluation of a rhodamine-WT dye/glycerin mixture as a tracer for testing direct injection systems for agricultural sprayers. Applied Engineering in Agriculture, 28(5), 643-646. https://doi.org/10.13031/2013.42424

Mercaldi, H. V., Fujiwara, C. H., Pefialoza, E. A., Oliveira, V. A., Cruvinel, P. E. (2015). Smart and customized electrical conductivity sensor for measurements of the response time from sprayers based on direct injection. Sensors & Transducers, 193(10), 1.

Rockwell, A. D., Ayers, P. D. (1996). A variable rate, direct nozzle injection field sprayer. Applied Engineering in Agriculture, 12(5), 531-538 https://doi.org/10.13031/2013.25680

Sudduth, K. A., Borgelt, S. C., Hou, J. (1995). Performance of a chemical injection sprayer system. Applied Engineering in Agriculture, 11(3), 343-348. https://doi.org/10.13031/2013.25747.

SUMMARY OF THE INVENTION

A preferred embodiment provides a direct injection agricultural spray system. The system includes a chemical tank configured to store a chemical for application and a carrier tank configured to store a carrier fluid. A primary sensor senses chemical concentration in a chemical injection line downstream of the chemical tank. A plurality of nozzle assemblies are included, and at least two of the plurality of nozzle assemblies separately have a carrier flow meter on a carrier flow line, an injection point downstream of the carrier flow meter that receives the carrier flow line and a chemical injection line, and a secondary sensor downstream of the injection point that senses carrier concentration, and a nozzle downstream of the secondary sensor. A control controls flow from the chemical tank and the carrier tank to target a predetermined chemical concentration at the nozzles, wherein the primary sensor establishes a maximum chemical concentration and a calibration curve for the chemical concentration and using this calibration curve, the chemical concentration is determined and controlled based on the output of the secondary sensor.

A preferred embodiment provides a method for monitoring and controlling chemical concentration in a direct injection agricultural sprayer system monitors initial chemical concentration output from a chemical tank, carrier flow from a carrier tank, and mixed chemical concentration at nozzles of the spray system downstream of individual mixing points of the nozzles. Flow from the carrier tank and/or the chemical tank are controlled to target a set concentration at each of the nozzles. The initial chemical concentration establishes maximum concentration and a calibration curve for a chemical being applied and the mixed chemical concentration establishes an applied concentration in view of the calibration curve.

BRIEF DESCRIPTION OF THE PREFERRED EMBODIMENTS

Figure 1:
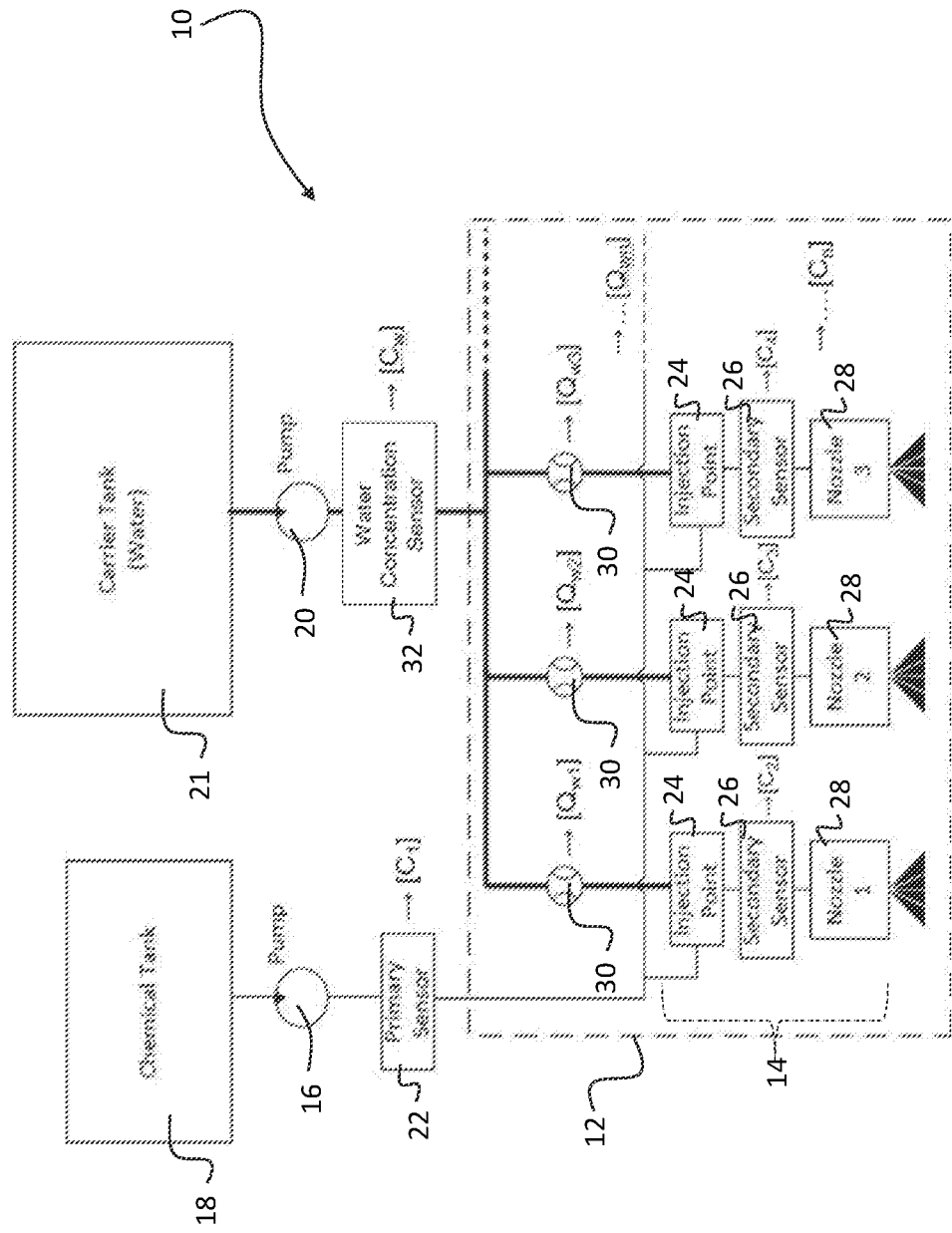
FIG. 1 is a block diagram of a preferred embodiment direct injection sprayer system for a farm implement.
Figure 5:
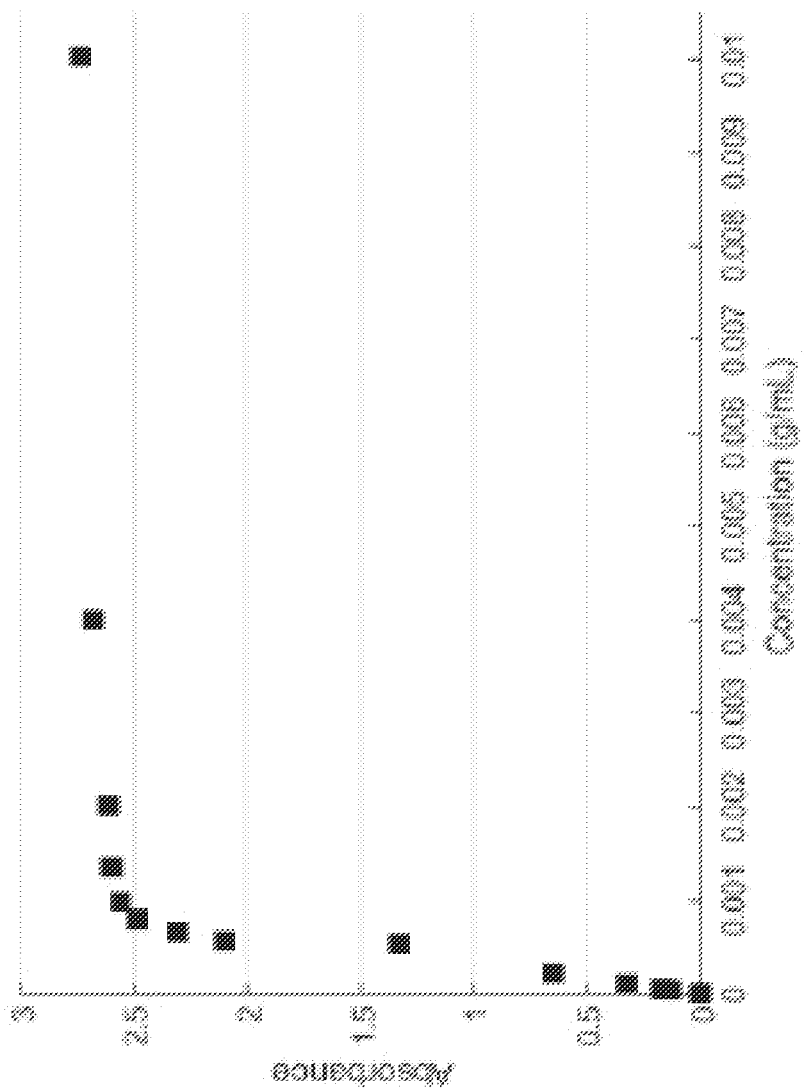
Figure 6:
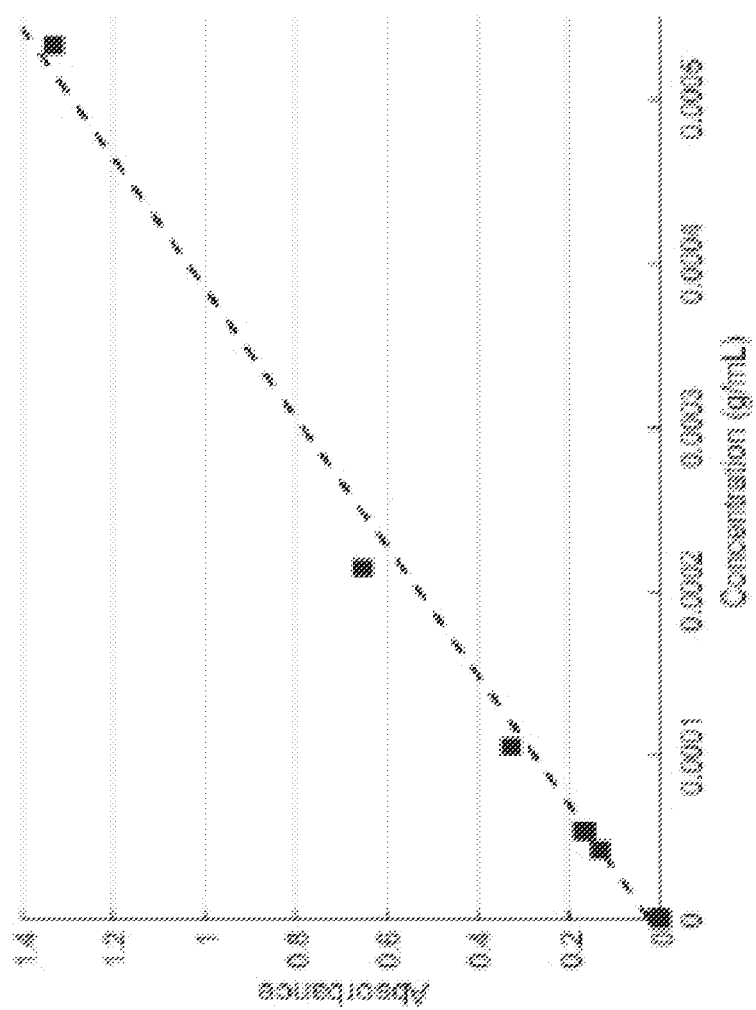
Figure 7:
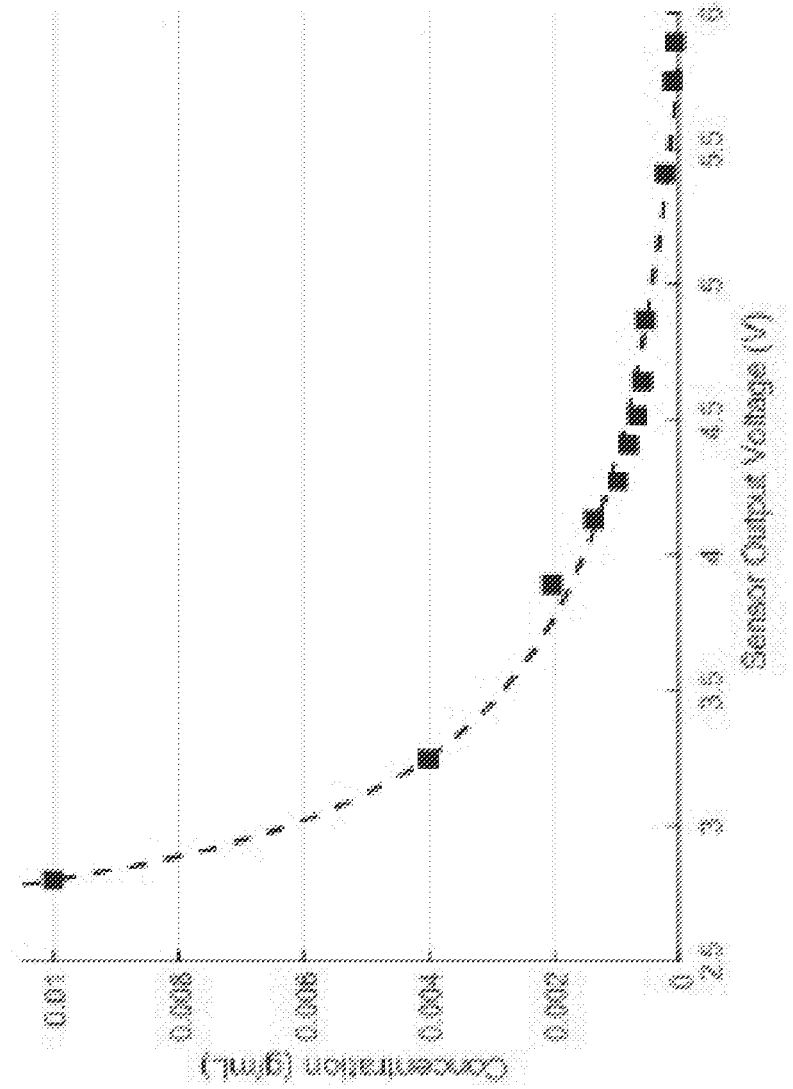

FIG. 5 graphs experimental absorbance data compared to concentration for an experimental sensor consistent with FIG. 1;

FIG. 6 graphs experimental absorbance data compared to concentration for concentrations of 2000:1 for an experimental sensor consistent with FIG. 1;

FIG. 7 graphs experimental sensor voltage compared to concentration for an experimental sensor consistent with FIG. 1

DESCRIPTION OF PREFERRED EMBODIMENTS

Preferred embodiment methods and systems improve the application accuracy of DI systems via sensing that determines chemical concentration after an injection point and immediately before the mixed carrier and chemical enters the spray nozzle for delivery by that spray nozzle. A preferred system automatically calibrates itself on the fly, because an initial sensor determines dye/chemical concentration, and the secondary sensing immediately prior to the nozzle is therefore not dependent upon an initial calibration and can maintain accuracy. Hardware and software of the initial sensor can detect a tracer or dye in the chemical concentrate to determine maximum concentration, which is used to set a calibration curve.

In a preferred system, one optical sensor is placed in the chemical line upstream of the mixing point and preferably immediately after a pump that pumps chemical fluid (typically with dye) from a chemical tank, and one is downstream of the mixing/injection point and immediately prior to the nozzle that will apply the mixed carrier and chemical. The sensor upstream of mixing establishes the maximum concentration and the calibration curve. The downstream sensor measures the applied concentration emitted from the nozzle. In the event that initial chemical/dye concentrations change, the preferred embodiment can eliminate any need for a new calibration curve for each new combination of chemical and dye since the ratio between the two sensors can be used to establishe the current chemical flow rate.

In preferred embodiment systems, optical sensors, e.g. reflectance or transmission-based sensors determine chemical concentration 1) immediately after exit from the chemical concentrate tank, 2) immediately after exit from the water tank, and 3) prior to a spray nozzle. Initial concentration ($[C_1]$) (concentration after exits from the chemical concentrate tank), background concentration in the water ($[C_w]$) and concentration at the nozzle ($[C_2 \ldots C_n]$) are determined. Travel speed and water flow rate for the nozzles are provided to or monitored by the system. Water flow rate ($Q_{w1} \ldots Q_{wn}$) is important to be continually monitored as a controller input, as it affects dilution of chemical/dye and is used to determine the flow of chemical at each nozzle. Detection of the concentration being applied $[C_1]$ does not require specific knowledge of dye concentration in any chemical added to the concentrate tank. Periodic monitoring is also acceptable. 5-10 Hz would be a reasonable period. Accurate, real-time rate control of the chemical application system is provided, which has been problematic for many prior systems (because low injection rates typically required are difficult to measure using flow sensors). In preferred embodiments, the data from the system is also available and utilized to create as-applied application maps or reports based on sprayer operational data. Preferred methods provide for quick changes in application rate as well as reduced waste of unused chemical.

Preferred embodiments of the invention will now be discussed with respect to experiments and drawings. Broader aspects of the invention will be understood by artisans in view of the general knowledge in the art and the description of the experiments that follows.

FIG. 1 shows a preferred embodiment direct injection sprayer system 10 for a farm implement. A sprayer boom 12 of the farm implement is indicated schematically, and the system 10 can be applied to any direct injection sprayer boom. The spray boom 12 includes multiple sprayer assemblies 14. Three are shown, but a typical boom will include six to a dozen sprayer assemblies. The present invention is applicable to a given number of sprayer assemblies and will operate with two, ten or dozens, e.g. 20 or 40. The direct injection system 10 includes a pump 16 for a chemical tank 18 and a pump 20 for a carrier tank 21. While one chemical tank is shown, the system 10 can also include multiple chemical tanks each having a pump. The number of tanks can increase with a larger number of sprayer assemblies. In addition, some systems may include additional chemical tanks to combine different chemicals for application. A primary sensor 22 monitors each chemical tank. Each of the sprayer assemblies 14 includes an injection point 24, a secondary sensor 26 and a nozzle 28.

The primary sensor 22 in preferred embodiments is an optical sensor. The role of the primary sensor is to sense the chemical concentration from the pump 16 that pumps the chemical tank. The concentration is not assumed by the system, as the "pure" chemical concentration of a supply of chemical can have a variation that affects the concentration eventually applied by the nozzles. Meters 30 determine the flow of carrier, typically water, to the injection points. Chemical and carrier are mixed at the injection points 24, and concentration of chemical at the nozzles 28 is monitored by the secondary optical sensors 26.

Constant recalibration can be accomplished with the preferred system 10. The primary sensor 22 is upstream of mixing, and establishes the maximum concentration and the calibration curve, which are then used by the downstream secondary sensors 26 to measure the applied concentration without need for a new combination of chemical. The chemicals can, for example, include pesticides, and dyes can be included to aid the optical sensing. The system 10 also includes an additional sensor 32 for water concentration. Normally, the water concentration can be assumed to be pure, i.e., close to 100%. However, when there is variation in the maximum reading (pure water) of the sensor due to differences in the water being used, a sensor in this location would be beneficial. Differences in the water being could be caused by using water from different sources that could have different absorbance properties (i.e. some water is less clear, affects the sensor output) that will affect the sensor reading.

Figure 2:
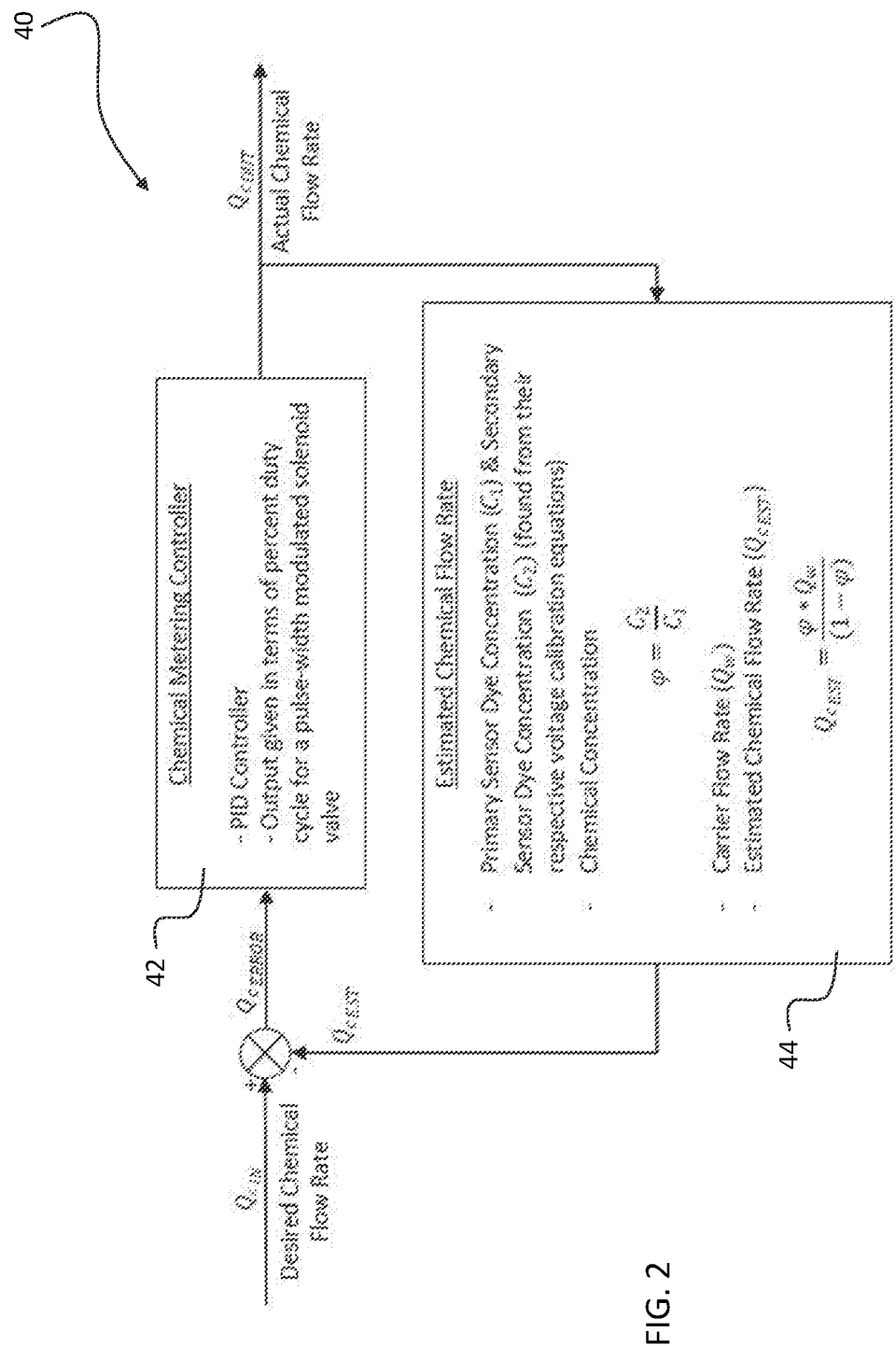
FIG. 2 shows a preferred control system of the direct injection sprayer system for a single sprayer assembly in the FIG. 1 system.

FIG. 2 shows a preferred control system 40 of the direct injection sprayer system 10 for a single sprayer assembly 14. Additional controls are used for each single sprayer assembly 14. The control system controls the pumps of the chemical and carrier tanks based upon the optical information from both of the primary and secondary optical sensors. An input to the control is the desired chemical concentration, which is by a user of the system, i.e. it is the desired flow of chemicals to be emitted from a nozzle 28 of a sprayer assembly 14. A chemical metering controller 42 can control several different entities in order to control a sprayer's application rate. These include, but are not limited to, the sprayer's pump speed 16 or 20, injection point (e.g., a solenoid valve) 24, injection pressure (also can be controlled by pump 16), and carrier pressure (also can be controlled by pump 20). Feedback 44 receives data from each of the primary 22 and secondary 26 sensors and based upon the data received, determines the chemical flow rate of the sprayer, which can be compared to a desired chemical flow rate to determine the appropriate response of the controller.

The following table lists inputs to the controller from the sprayer system, and the response of a preferred embodiment control system relative to a current operating set point (i.e., desired target rate):

Experiments have been conducted to determine requirements for the primary 22 and secondary 26 sensors. Large surface area optical sensors that increase the intensity of the response and sensors arranged in a non-parallel arrangement with respect an excitation source are preferred to increase the amount of radiation returned to the sensor after interacting with the liquid. The peak wavelength of the LED and photodiode should reflect the peak absorbance of the dye being used in the chemical tank. Other types of sensors that can be used include electrical conductivity, reflectance, and fluorescence sensors. One example is a Coriolis mass flowmeter, but such a meter is more expensive than the optical sensing.

Two photoelectric sensors for measuring chemical concentration were developed and tested to establish a calibration curve for a range of concentrations. One was a reflection based and the other transmission based. The reflection sensor was configured to measure the reflectance of light off of a fluid induced by a light source with an increase in dye concentration resulting in an increase in voltage response of the sensor. Such a reflectance sensor requires a large sensing area and a geometric configuration to maximize captured reflection of the excitation source. Dyes can be selected to maximize reflection and sensitive detection circuitry can also provide better sensitivity. The transmission sensor was configured to measure the absorbance, or transmittance, of light through the fluid with a higher voltage response correlating to a lower concentration of dye. The transmission sensor is preferred and is easier to implement than a reflection sensor. In experiments, the transmission sensor provided the best results. FIG. 7 shows data of dye concentration verses sensor output voltage indicating that the transmission sensor provides increasing voltage with decreasing dye concentration.

In experiments, each of the reflection and transmission sensors combined an LED with a photodiode both placed in an aluminum housing. The housing was built so that the sensor could be mounted in-line of the sprayer at any point. For each sensor, the same white LED (LEDWE-15, Thorlabs, Cal.) was used as the light source. In the absorbance test, the photodiode (OP905, Optek, Carrollton, Tex.) was placed opposite of LED across the fluid a distance of 7.98 mm. In order to capture more light with the reflectance sensor, a photodiode (SFH 203 P, OSRAM Opto Semiconductors, Regensburg, Ger.) with a wide input angle was chosen and placed on the same side of the housing as the LED. All optical devices were placed behind a sapphire sight glass (43-336, Edmund Optics, Barrington, NJ).

The same conditioning circuits were used for both the absorbance and reflectance tests. For the LED, a constant current source was needed. The circuit used in this experiment followed the design from Dvorak et al. (2016) which was developed around a voltage regulator and is shown in

| Sensor | Input Change | Response |
| --- | --- | --- |
| Primary Sensor | Sensor reads higher maximum concentration | Controller adjusts [$C_1$] value so that dilution estimate ($\varphi$) is correct for accurate $Q_{cEST}$ |
| | Sensor reads lower maximum concentration | Controller adjusts [$C_1$] value so that dilution estimate ($\varphi$) is correct for accurate $Q_{cEST}$ |
| Carrier Flow Meter | Carrier flow increases | Chemical injection rate increases |
| | Carrier flow rate decreases | Chemical injection rate decreases |
| Secondary Sensor | Sensor reads higher chemical concentration | Chemical injection rate decreases |
| | Sensor reads lower chemical concentration | Chemical injection rate increases |

Figure 3:
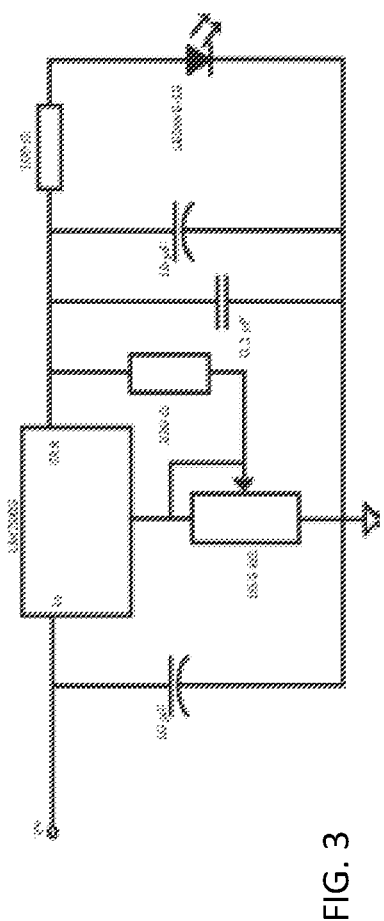
FIG. 3 shows a preferred voltage regulator circuit for an optical sensor of the FIG. 1 system.
Figure 4:
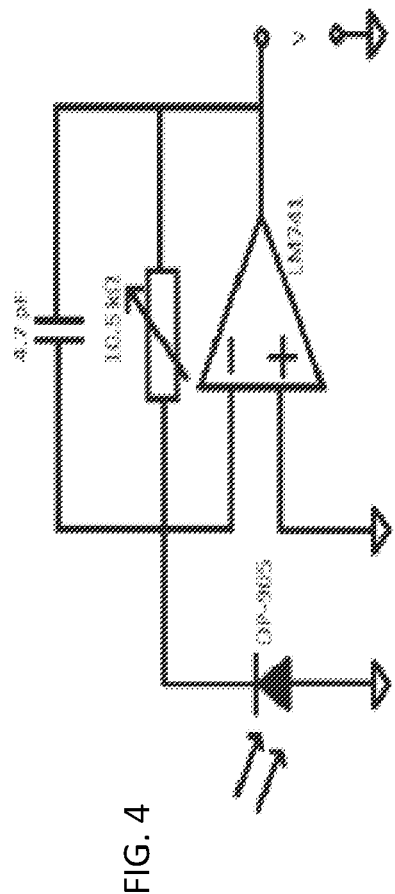
FIG. 4 shows a preferred adjustable amplifier for an optical sensor of the FIG. 1 system.

FIG. 3. An adjustable transimpedance amplifier shown in FIG. 4 was used with the photodiode in order to increase the voltage output to appropriate and readable levels. For both photodiodes, the response voltage ranged between 2 and 6 V.

A Measurement Computing data acquisition board (USB-1208FS, Measurement Computing, Norton, Mass.) was used along with Microsoft Visual Studio in order to collect data. Following the procedure from Sudduth et al. (1995) and Dvorak et al. (2016), the board was set to sample at 30,000 Hz and averaged every 500 samples to produce one reading from the sensor every 16.7 ms. For every test at a certain concentration, 100 readings were averaged together as a final value to be used in the calibration curve for each sensor.

In order to change the absorbance and reflectance, and thus the readings for each sensor, a red dye (EW-00298016, Cole-Parmer, Vernon Hills, Ill.) was used. The same dye was used by Luck et al. (2012), where it was used for absorbance measurements as well as in combination with glycerin to simulate pesticides. A serial dilution involving the dye was performed in order to simulate different flow rates from an actual sprayer. The initial concentration represents the concentration of dye within only the chemical tank on a sprayer.

Tap water at a temperature of 20 to 21 degrees Celsius was used for all of the dilutions. The following three initial concentrations were tested; 100:1, 2000:1, and 20,000:1. These initial concentrations were then diluted to simulate the flow rate of water that the chemical/dye mixture would be injected into. Each final solution contained 25 mL placed in a test tube. All of the samples from concentrations 2000:1 and below were tested with a spectrophotometer (DU 730 Spectrophotometer, Beckman Coulter, Brea, Cal.) in order to verify Beer's Law, which states that concentration is linearly proportional to absorbance. To test the sensors, one threaded end was plugged, and the solution was poured into the housing and covered to ensure no ambient light could reach the sensors. The values were recorded and then stored to files via the data acquisition board and Visual Studio program. MATLAB was used to plot the data along with appropriate regression lines.

Absorbance for all of the samples were tested with the spectrophotometer and the data is shown in FIG. 5. At higher concentrations Beer's law fails and the linear relationship deteriorates, which can also be seen from Luck et al. (2012). Therefore, the absorbance measurements for concentrations of 2000:1 and lower were plotted in FIG. 6 This range of concentrations follow Beer's Law with a linear relationship with an R2 value of 0.990 showing that our dye is an effective.

A first reflectance sensor tested failed to accurately predict concentration with a photodiode that was parallel to the light source. Using a large area photodiode and/or placing the photodiode and LED pair at a non-parallel angle which directs more light to the photodiode generates a stronger response. By large area, what is meant is that larger than the minimum surface area that is capable of producing an output that changes with dye concentration. This is also affected by LED intensity, but it is generally preferred to have larger areas for sensing within the physical limits of the conduits carrying the flow that is monitored. The following equation shows:

$$C = \frac{-0.001335*SO + 0.007765}{SO - 2.398}$$

where C is the concentration of the dye and SO is the sensor output. This represents the dye concentration produced by a sensor, so it represents $C_1$ and $C_2$ in FIG. 1. Each sensor would produce a dye concentration measurement that is used in FIG. 2 feedback calculation. This curve fits well, with an R2 value of 0.998. The data shows that the curve could predict concentrations from 250:1 to 5000:1, giving an overall dilution range of 20:1. Luck et al. (2012) notes an estimated dilution range for pesticides to be approximately 11:1, so this sensor can perform within the range necessary for actual operation.

The LED and photodiode pair was effective in measuring concentration using the absorbance or transmittance technique. A rational regression model was able to fit the data to an R2 value of 0.99 and a standard error of $1.23^{e-4}$.

The PID controller responds to differences in the desired and measured chemical flow rates and adjusts the flow rate appropriately. In response to a concentration above a desired target rate at the secondary optical sensor, the control system will decrease the chemical flow rate. In response to a concentration below a desired target rate at the secondary optical sensor, the control system will increase the chemical flow rate. Variations at the primary optical sensor are monitored and the control system will correct flow rates according to an increase or decrease in initial concentration. Many different variables can affect the resolution of the control system. These can include different injection or carrier pressures, or different chemical flow control methods such as a variable speed pump or pulse-width modulated (PWM) solenoid valve. With an injection pressure of 80 psi and carrier pressure of 30 psi, a change of 0.001 mL/s per 1% change in PWM duty cycle was possible. Other options can be used (fuzzy logic, PI, PD, etc.). The control algorithm used should control the injection rate at each nozzle (pump or PWM) and can also control the overall pump speeds. In preferred embodiments, the primary and secondary sensors are able to measure differential concentrations (the difference potential between primary and secondary sensor) of at least 1:34 and as high as: 1:17 for the maximum-to-diluted chemical concentrations, and individually the sensor can accurately measure dilutions of up to 2000:1. Preferred systems don't require daily calibration because the combination of primary and secondary concentration sensors, coupled with carrier flow rates, is capable of estimating chemical flow rates based on the embedded algorithm. Preferred system can handle a wide variety of chemicals without recalibration. As the preferred system utilizes a ratio of the max/diluted dye, there is no need for a database of initial calibrations for different chemicals and dyes, and no need for a highly accurate initial calibration. The control system can additionally or alternatively adjust the carrier flow rate, for example to add minimum and maximum amounts of chemicals into upper and lower limits of water according to a particular chemical to maintain chemical dilutions within those limits.

In an experimental system the sensors were constructed with LED and photodiode pairs, along with a constant current design for the LED and a transimpedance amplifier for the photodiode. The LED and photodiodes were mounted behind a sealed sapphire window that allowed transmittance and absorbance across a width of 7.98 mm of the mixed fluid. The light source was a white LED with 13 mW of optical power over a wavelength range of 430 nm to 660 nm. In commercial embodiments, preferred sensors and light sources include other LEDs with more specific wavelengths (e.g., a narrower band of 550 nm for fluorescing a Rhodamine WT dye for a reflectivity-based measurement) and appropriate photodiode pairs. Filters for the LED and photodiodes can be used to enable narrower wavelength bandwidths. The systems can use power from a 12V or 24V DC system, already available for typical spray systems on farm implements.

Preferred embodiments of the invention are described in the appendix that follows the example claims. While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A direct injection agricultural spray system, the system comprising:
    a chemical tank configured to store a chemical for application;
    a carrier tank configured to store a carrier fluid;
    a primary sensor that senses chemical concentration in a chemical injection line downstream of the chemical tank;
    a plurality of nozzle assemblies, wherein at least two of the plurality of nozzle assemblies separately comprises a carrier flow meter on a carrier flow line, an injection point downstream of the carrier flow meter that receives the carrier flow line and a chemical injection line, and a secondary sensor downstream of the injection point that senses carrier concentration, and a nozzle downstream of the secondary sensor; and
    a control system that controls flow from the chemical tank and the carrier tank to target a predetermined chemical concentration at the plurality of nozzle assemblies, wherein the primary sensor establishes a maximum chemical concentration and a calibration curve for the chemical concentration and using this calibration curve, the chemical concentration is determined and controlled based on the output of the secondary sensor.

2. The spray system of claim 1, wherein the primary sensor comprises a primary optical sensor and the secondary sensor comprises a secondary optical sensor.

3. The spray system of claim 2, wherein the control system sets the chemical flow rate from the chemical carrier tank via a combination of the maximum chemical concentration and carrier fluid flow rate to target the predetermined concentration.

4. The spray system of claim 1, wherein the control system continuously monitors the primary sensor, secondary sensor, and carrier flow rate, and adjusts the carrier flow rate according to target the predetermined concentration.

5. The spray system of claim 1, wherein the control system periodically monitors the primary sensor, secondary sensor, and carrier flow rate, and adjusts the carrier flow rate according to target the predetermined concentration.

6. The spray system of claim 1, wherein the secondary sensor is immediately prior to nozzles of the plurality nozzle assemblies with no intervening device or fluid flow there between.

7. The spray system of claim 1, attached to a farm implement.

8. The spray system of claim 1, wherein the chemical tank holds a pesticide and the calibration curve provides calibration for the pesticide.

9. The spray system of claim 1, wherein the chemical tank holds a fertilizer and the calibration curve provides calibration for the fertilizer.

10. The spray system of claim 1, wherein the control system conducts control at each nozzle of the plurality of nozzle assemblies according to proportional integral derivative control that responds to differences in desired and measured chemical flow rates and adjusts the flow rate appropriately.

11. The spray system of claim 1, wherein the primary and second sensors comprise optical transmission sensors.

12. The spray system of claim 1, wherein the primary and second sensors comprise optical reflection sensors.

13. The spray system of claim 12, wherein the reflection sensors comprise a light source and a light sensor arranged non-parallel to each other.

14. A method for monitoring and controlling chemical concentration in a direct injection agricultural sprayer system, the method comprising:
    monitoring initial chemical concentration output from a chemical tank;
    monitoring carrier flow from a carrier tank;
    monitoring mixed chemical concentration at nozzles of the spray system downstream of individual mixing points of the nozzles; and
    controlling flow from the carrier tank and the chemical tank to target an applied concentration at each of the nozzles, wherein the initial chemical concentration establishes maximum concentration and a calibration curve for a chemical being applied and the mixed chemical concentration establishes the applied concentration in view of the calibration curve.

15. The method of claim 14, wherein the calibration curve is continuously updated.

16. The method of claim 14, wherein the calibration curve is periodically updated according to a predetermined duty cycle.

* * * * *